Aug. 16, 1960    F. B. PFEIFFER    2,948,998
PACKAGING
Filed Feb. 17, 1959    3 Sheets-Sheet 1
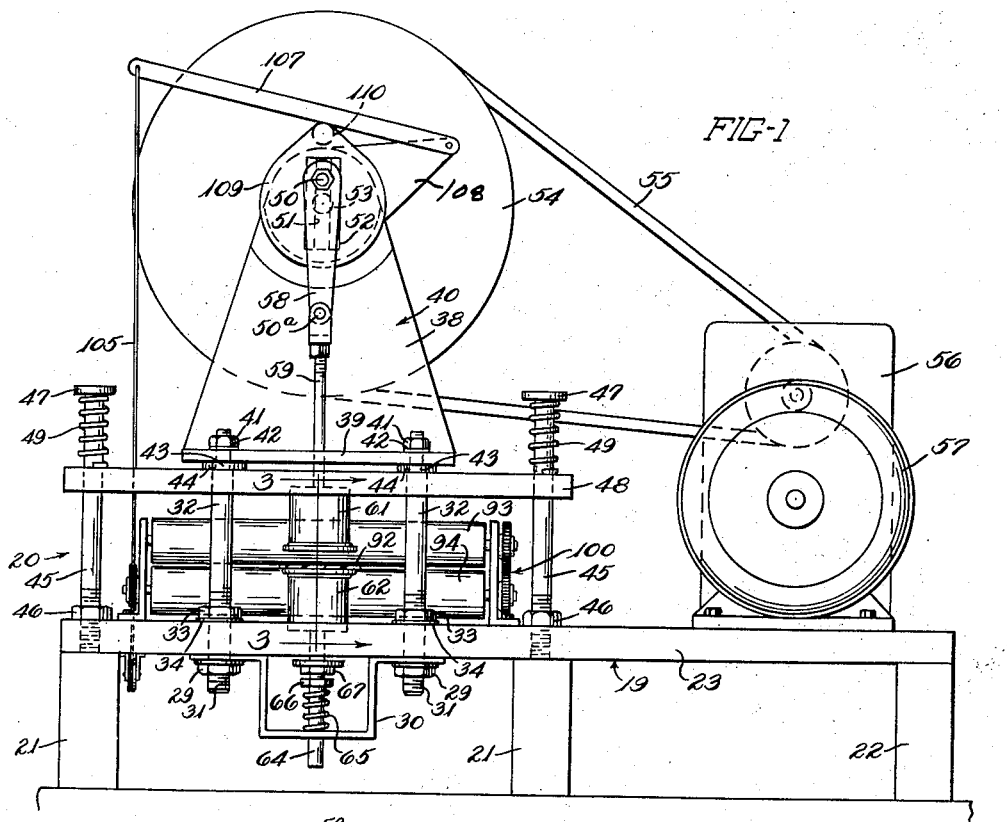
FIG-1
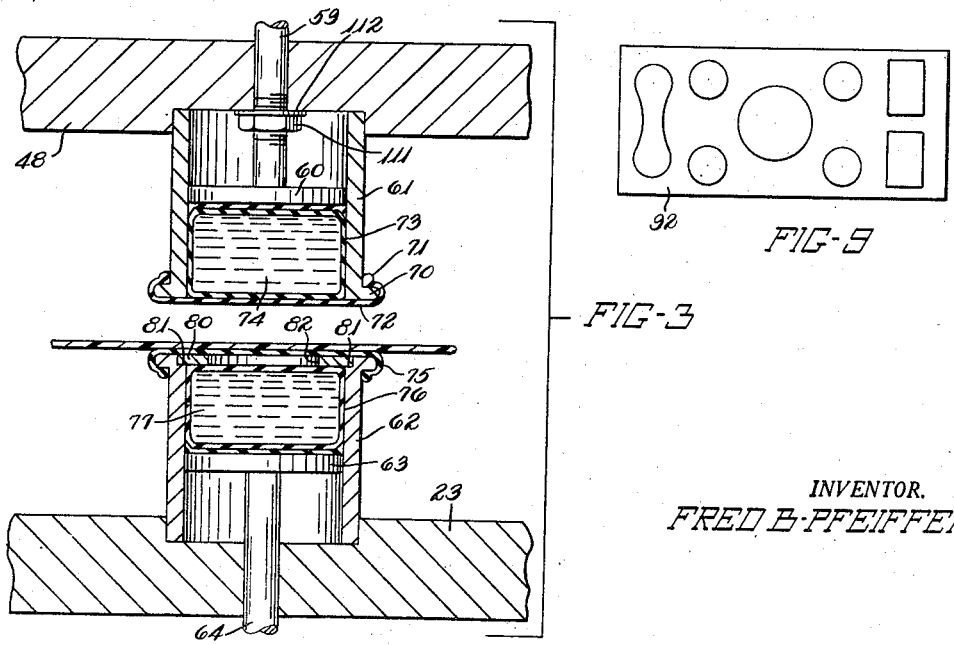
FIG-3
FIG-2
INVENTOR.
FRED B. PFEIFFER Aug. 16, 1960     F. B. PFEIFFER     2,948,998
PACKAGING
Filed Feb. 17, 1959     3 Sheets-Sheet 2
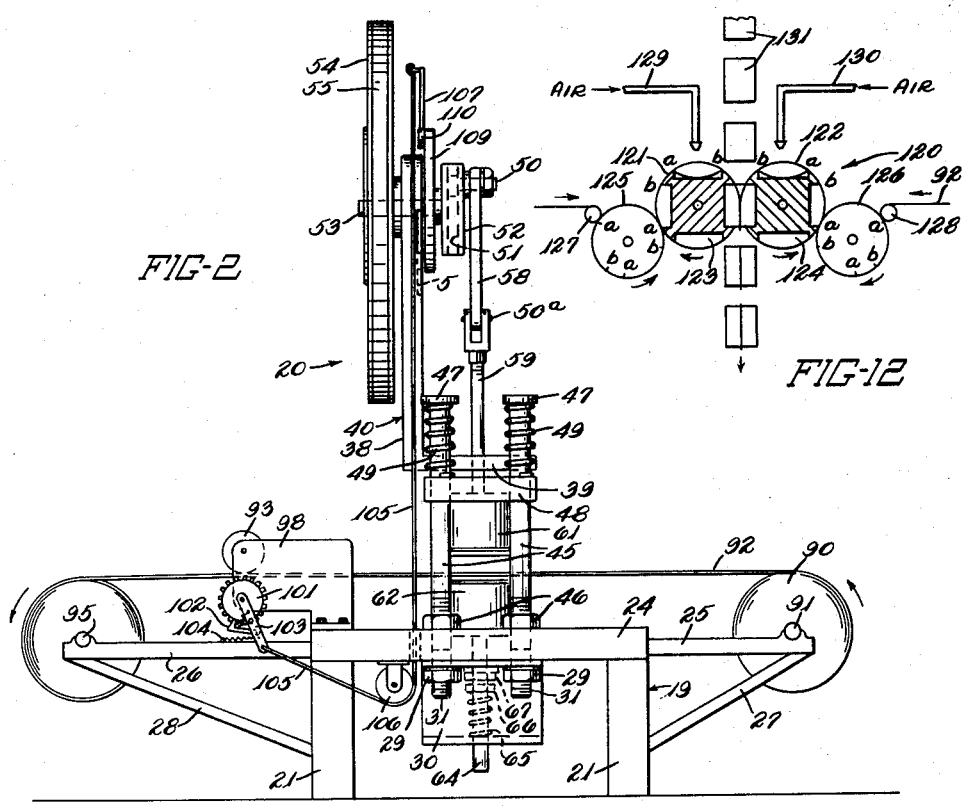
FIG-2
FIG-12
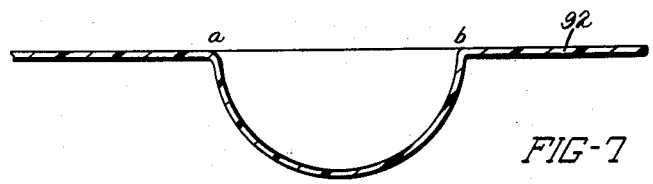
FIG-7
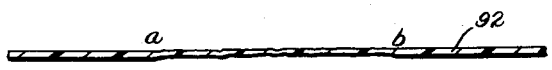
FIG-8
INVENTOR.
FRED B. PFEIFFER

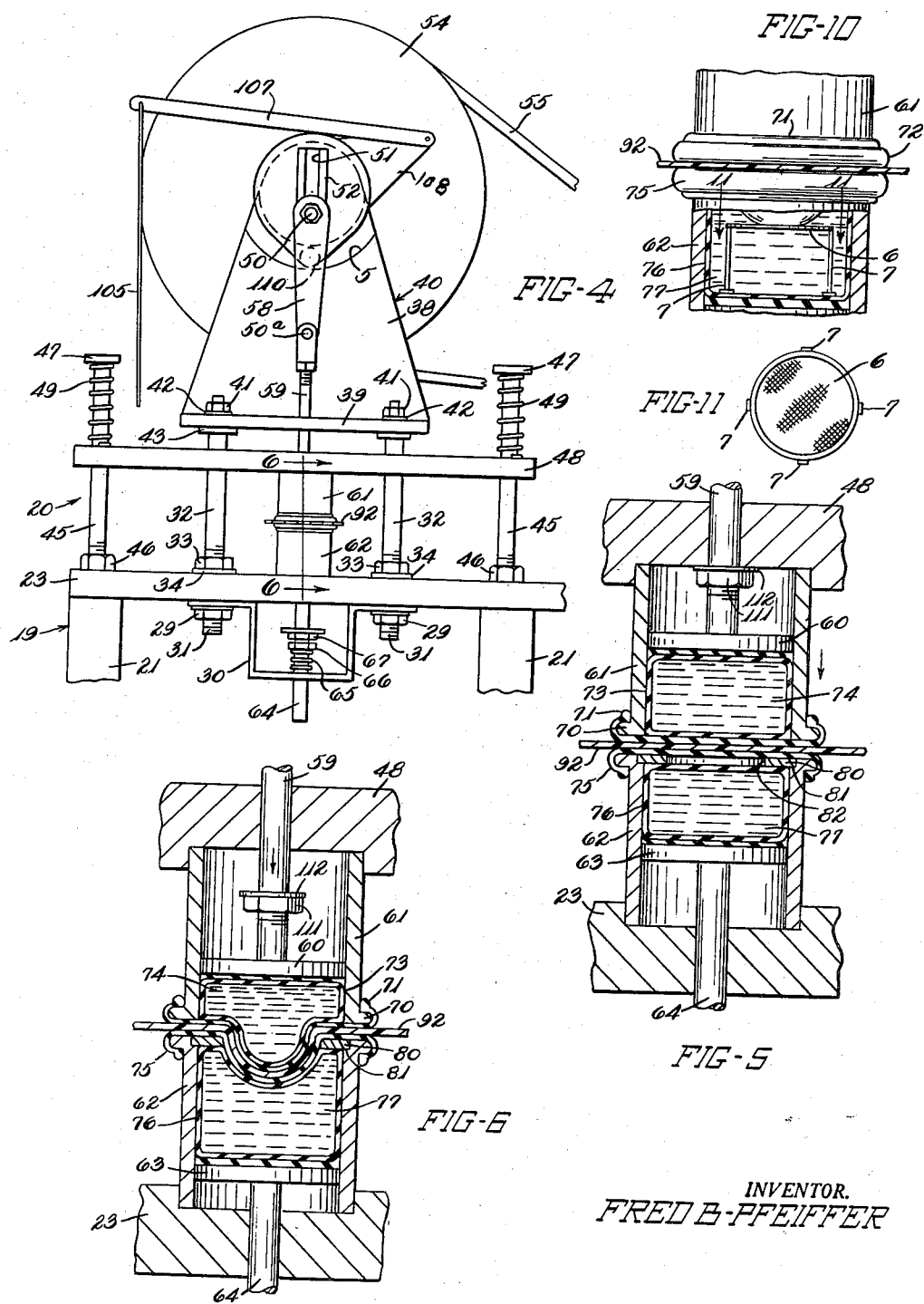

United States Patent Office 2,948,998
Patented Aug. 16, 1960

2,948,998
PACKAGING
Fred B. Pfeiffer, 270 Ferndale Ave., Akron, Ohio, assignor of one-half to Jesse R. Crossan
Filed Feb. 17, 1959, Ser. No. 793,730
13 Claims. (Cl. 53—28)

This invention relates to methods of forming pockets in sheet material of a kind adapted for use in packaging and to methods of inclosing articles, to be packaged, in said pockets and to apparatus for practicing such methods.

I prefer to use a material that is heat-sealable, transparent, non-toxic, will substantially retain its stretched form, has good aging characteristics and is inexpensive relative to other thin transparent sheet wrapping materials presently in commercial use. These requirements are met, for example, but not to be limited to, thermoplastic, extensible, flexible films such as films of the polyolefins, on the order of low and high density polyethylene (which may be plasticized by the addition of low molecular weight polyolefins), polypropylenes (particularly those containing amount of atactic material to plasticize same); vinylidene chloride polymer and copolymers such as saran; plasticized vinyl chloride; resin films and rubber hydrochloride films. It is also to be understood that the invention contemplates forming pockets, in sheet material to customer's specifications and rolling-up the converted sheet material for delivery or storage.

I am aware of numerous patents that disclose drawing or forcing sheet material into pockets to receive golf ball cores and cover same or to receive articles to be packaged. However the present invention is distinct from the broad field of forming pockets in sheet material in that it is directed to providing means for rapidly forming pockets of substantial depth, in sheet material, of a type that before this invention was commercially impractical because the film would rupture. The present invention, for the first time, makes possible a useful and practical method of forming pockets, in such materials as set out above, for use in the packaging art.

A principal object of the invention is to provide means for forming pockets in a single or superimposed sheets of said materials by sandwiching the sheet or sheets, at the area in which the pocket is to be formed, between layers of elastic material, such as rubber, supported over a predetermined size and shape opening or openings, in a rigid plate and then subjecting said suspended area of elastic material to fluid pressure whereby the layers of elastic material are forced through the opening or openings and extended below said plate in a stretched condition carrying with said layers the sheet material in which said pockets are to be formed, said layers of elastic material imparting to said sheet material a stretch corresponding to the stretch of the elastic material while effecting a degree of molding of said sheet or sheets of material.

Another object of the invention is to form pockets in a sheet or sheets of wrapping material to predetermined specifications in such manner that the converted sheet or strip may be run into rolls for storage or later use without a build-up of volume of material over the pocket areas, that is without an accumulation of material in the roll at the pocket areas and thus provide a smooth tight roll.

Another object of the invention is to subject both layers of elastic material between which the sheet material is being worked to fluid pressure whereby there is no interruption of said layer's contact with said sheets or bridging of said layers over depressions in the surface of the sheet material.

A further object of the invention is to provide means for forming pockets in separate sheets of wrapping material; advancing said sheets in a converging direction relative to each other with the pockets in the separate sheets coming into register; feeding an article, articles or material to be packaged into said pockets before the pockets come into complete register and sealing the sheet material about said article, articles or material.

A still further object of the invention is to control the temperature of the sheet material in which pockets or recesses are being formed.

Yet another object of the invention is to provide means for controlling the size and shape of the pocket formed and to provide unstretched window-like areas therein.

An additional object is to provide a method and apparatus for wrapping in whole or in part objects of irregular or spherical shape which method and apparatus requires less area of said wrapping material, than has been possible heretofore.

An important object is to provide a stretched sheet of wrapping material that is substantially of uniform thickness about an article which it incloses or, if desired, of a predetermined variation of the thickness at different areas of the sheet.

The foregoing and other objects, features and advantages of the invention will readily appear from the following description in connection with the accompanying drawings, wherein the invention has been shown merely by way of illustration and wherein:

Figure 1 is an end view of the apparatus embodying the invention, with sheet clamping and pocket forming means shown in open position;

Figure 2 is a left-side view of the apparatus of Fig. 1, with sheet material supply and take-off rolls being shown;

Figure 3 is an enlarged fragmentary sectional view taken along line 3—3 of Fig. 1;

Figure 4 is a partial view similar to Fig. 1 except the clamping means are shown in their closed position with the sheet clamped and the pockets formed;

Figure 5 is an enlarged fragmentary sectional view of the apparatus showing the relative positions of the forming means and the sheet material as they appear just prior to the pocket forming operation;

Figure 6 is the same as Fig. 5 except the relative positions of elements of the apparatus are illustrated at time pocket has been formed but before pocket forming pressure has been released;

Figure 7 is an enlarged sectional view of a pocket wall before the pocket has been returned to the original plane of the sheet in which the pocket has been formed;

Figure 8 is similar to Fig. 7 showing the sheet material after removal from the apparatus;

Figure 9 is a diagrammatic view of a modification showing an example of various sizes and shapes which may be used in the plate of the forming means;

Figure 10 is similar to Fig. 6 but showing a fragmentary view thereof with the addition of a limit plate and somewhat diagrammatically its effect;

Figure 11 is a view taken along line 11—11 of Fig. 10; and

Figure 12 is a diagrammatic view of the sheet material of the invention being utilized in a packaging operation.

I prefer, but without limitation, to use polyethylene for wrapping material. It is now available in rolls or webs of suitable thickness and length to satisfy the needs of continuous and high speed forming of pockets therein and the inclosing of articles to be wrapped in said pockets as the sheet or web advances through the apparatus.

Referring now to Figs. 1, 2 and 4 there is shown apparatus referred to generically as 20. As will be seen by reference to those figures the apparatus there shown is disposed on a supporting frame referred to generically as 19 and comprising legs 21 and 22, only one of two legs 22 being shown, horizontal members 23, 24, 25, 26, 27 and 28. Rails 25 and 26 are in spaced pairs supported at their outer ends by braces 27 and 28 as will be seen by reference to Fig. 2.

Mounted on frame 19 and extending downwardly from the horizontal members is a U-shaped bracket 30 held in position by means of nuts 29 on the threaded ends 31 of vertical posts 32 which posts are retained in fixed position on said frame by nuts 33 and washers 34 as will be understood by reference to the drawings. An angular bracket 40 is rigidly mounted on the upper ends of posts 32 by means of nuts 41 and washers 42 and 43 as shown, it being understood that washer 43 rests on shoulders 44 provided on posts 32. Bracket 40 has a substantially isosceles triangular vertically disposed plate-like portion 38 with its vertex rounded and an L base 39 which is attached to post 32 as just explained.

Four additional upright posts 45 are threaded at their lower ends in horizontal members of frame 19 as shown and locked in position by nuts 46. The top ends of posts 45 terminate in head portions 47 and these posts have mounted thereon, in sliding relation therewith, a plate 48 and coiled springs 49 interposed relative to nut 47 and plate 48.

A crankpin 50 is mounted in a slot 51 in rotatable plate 52 which in turn is mounted on shaft 53. Shaft 53 is journalled in bracket 40 and driven by pulley wheel 54 through the medium of belt 55, reduction gear 56 and motor 57. Slot 51 is a slide for the crankpin for adjustment of the stroke as will be understood by those familiar with the art. A connecting arm 58 pivotally connects a piston rod 59 by pin 50a to crankpin 50 to actuate piston 60 in its cylindrical case 61 (see Figs. 5 and 6).

A second cylinder case 62 is mounted on frame 19 in stationary relation therewith and below and aligned with cylinder case 61. Cylinder case 62 has piston 63 and piston rod 64. By reference to Figs. 1 and 4 it will be seen that piston rod 63 extends into and through U bracket 30 and is axially movable through the lower wall of this bracket and frame member 23. Piston rod 64 is provided with an actuating coiled spring 65 interposed relative to an adjusting nut 66 and the bottom of U bracket 30. Nut 66 is in threaded relation to piston rod 64 for adjustment of the compression to which spring 65 may be subjected. A nut 67 in threaded relation with piston rod 64 is adapted to limit the upper travel of piston 63.

Referring again to cylinder case 61 (Fig. 5) a flange 70 extends radially outwardly from its lower edge forming a substantial lip for anchoring beaded edge 71 of a rubber diaphragm 72. This diaphragm is stretched tightly across the lower open end of cylinder case 61 so as to resist stretching or distortion from the weight it supports when piston 60 is retracted. Obviously numerous ways of anchoring diaphragm 71 will occur to artisans and the invention is not to be limited to the specific method of anchoring shown. An elastic bladder 73 which may be composed of rubber and filled with permanently inclosed fluid 74 is disposed in cylinder case 61 between piston 60 and diaphragm 72. The volume of fluid, which may be water, glycerin or any flowable material found satisfactory, should not exceed the space between piston 60 and diaphragm 72 when piston 60 is in its raised position.

Cylinder case 62 is provided with diaphragm 75, bladder 76 and fluid 77 which correspond to diaphragm 72, bladder 73 and fluid 74 respectively.

It is to be understood that sealing gaskets at the pistons may be substituted for the bladders 73 and 75 but I prefer said bladders and have found it beneficial to cement or otherwise attach the bladders to the wall of the cylinders adjacent said diaphragms.

An important feature of the invention is the provision of a rigid plate 80 disposed on a shoulder 81 at the top of cylinder case 62. Plate 80 has an opening 82 therethrough of predetermined size and shape. Diaphragm 75 bridges opening 82 and it is to be noted that the edge of opening 82 is inwardly of the wall of case 62 thus providing an over-hang into the case 62.

By reference to Figs. 1 and 4 it will be seen that spring 65, when not subjected to pressure from the top piston 60 is adapted to raise piston 63 until nut 67 contacts frame 19 as illustrated in Fig. 1. The volume of fluid 77 and bladder 76 should not exceed but should equal the space between plate 80, diaphragm 75, and piston 63 when the latter is in its raised position thus avoiding bulging diaphragm 75 upwardly and interfering with sheet material as it is advanced through the apparatus 20.

Means for advancing sheet material, in which pockets are to be formed, through the apparatus and to synchronize the pocket forming action of the apparatus with periodic advance of the sheet material will now be described (Figs. 1 and 2). A roll of material 90 such as polyethylene of suitable width and thickness for articles to be packaged is mounted on frame 19 as shown in Fig. 2. If desired braking means may be applied to roll 90 or its shaft 91, on which it is supported, to prevent the said material from over-running. The sheet or strip 92 is led manually through the apparatus between diaphragms 72 and 75 (Fig. 3), driven bite rolls 93 and 94 and thence onto a driven take-off shaft 95. It is to be understood that shaft 95 may be driven in any conventional manner and that known compensator means may be provided for the advancing sheet material between the said bite rolls and shaft 95 or the take-off shaft may be omitted and the sheet with pockets formed therein led directly to a wrapping station. Shafts 96 and 97 and bite rolls 93 and 94 respectively are journalled in brackets 98 and 99 bolted to frame 19 (Fig. 1). Suitable gear for uniform surface speed of rolls 93 and 94 are meshed at 100 as will be understood by those skilled in the art. On the end of shaft 97 opposite its gear at 100 there is mounted ratchet wheel 101 adapted to drive roll 94 and comprising pawl 102, reciprocating lever 103, retraction spring 104 for lever 103 and cable 105. The usual pawl for preventing back motion may be provided if found desirable. Cable 105 runs over idler pulley 106 upwardly and is attached to the end of cam follower arm 107. The end of arm 107, opposite the attachment of the cable, is pivotally mounted on a bracket 108 extended from or may be integral with bracket 40. A cam 109 with pin 110 disposed eccentrically of and projecting therefrom rocks arms 107 upwardly as pin 110 comes into its highest position with the rotation of cam 109. Cam 109 is rotatably mounted on shaft 53 between bracket 40 and plate 52 and is so mounted relative to plate 52 so that when crankpin 50 of plate 52 is in its lowest position cam pin 110 is out of contact with cam follower arm 107. A shallow groove 5 in bracket 40 provides clearance for the arcuate travel of pin 110.

The operation of the foregoing described apparatus is as follows:

First a strip 92 of suitable sheet material is led from roll 90 between diaphragms 72 and 75 into the bite rolls and onto take-off shaft 95 with the elements of the apparatus disposed as shown in Fig. 2. Next motor 57 is started rotating shaft 53 through the medium of belt 55 and pulley 54. Shaft 53 rotates slotted plate 52 carrying arm 58, piston rod 59 and piston 60 in a down stroke. The downward movement of piston 60 moves a nut 111 and its washer 112 downward from plate 48. Since nut 111 is threaded onto piston arm 59 so as to contact and carry plate 48 upwardly with the up-stroke of piston 60 and thereby compress springs 49 the downstroke results in plate 48 being forced by springs 49 to slide downwardly on posts 45 until the lower end of cylinder case 61, covered by diaphragm 72, contacts the strip 92 and clamps this strip firmly against diaphragm 75 disposed on the upper end of cylinder case 62 and plate 80 (Fig. 5). The volume of fluid 74 in cylinder case 61, relative to the compression or downward stroke of piston 60, is such that the said clamping of strip 92 precedes by a short interval piston's 60 pressure contact with the bladder 73. As piston 60 continues its compression stroke those portions of the walls of diaphragms 72 and 75 and bladders 73 and 76 that overlie the opening in plate 80 are forced therethrough downwardly into fluid 77. Displacement of fluid 77 can only occur by the bottom of bladder 76 pressing against piston 63 and moving it downwardly against the resistance of spring 65 during which movement there are differential pressures in fluids 74 and 77. The length of the stroke of upper piston 60 adjustable by selection of the position of pin 50a in slot 51 and the resistance to the downward forces of fluid in cylinder case 61 is adjustably opposed by spring 65 plus the force necessary to stretch the walls of said bladders, diaphragms and the sheet material sandwiched between the diaphragms.

During the compression stroke of the cylinders cam arm 107 is inactive but as plate 52 continues to rotate and returns piston 60 to its highest position and compression spring 65 returns piston 63 to its highest position as determined by contact of nut 67 with frame member 23, arm 107 is rocked upwardly drawing cable 105 about grooved wheel 106 and actuating lever 103 of ratchet 101 whereby bite rolls 93 and 94 are rotated a predetermined degree on surface distance which draws the strip 92 through the apparatus a corresponding amount after which the ratchet wheel returns to its inactive position until another cycle begins. The pocket 10 illustrated in Figs. 7 and 6, is returned with diaphragm 75 to the original plane of strip 92 at the area the pocket was formed as illustrated in Fig. 8 the returned wall of the pocket being shown between points A and B. The area of material between points A and B is wrinkled in all directions and it is important to note that the volume of material in a given area between points A and B is the same as the volume in a corresponding area of the strip not subjected to formation of pockets. One important advantage of this feature is that strip 92, with numerous closely spaced pockets therein, can be wound into a smooth roll for storage or subsequent use without pile-ups of material over the pockets. The return of the pockets to their original plane makes possible the passing of the material through the apparatus. The travel of strip 92, controlled by the ratchet wheel and bite rolls, is such as to present a closely adjacent new area of film between said diaphragms for the following cycle of operation of the apparatus.

I have found that the pockets can be formed in polyethylene at room temperature with apparatus described above with a sudden thrust of the diaphragm whereas by any other method, of which I am aware, a pocket of substantial depth, such as required to be of commercial value, can only be formed by a slow application of pressure and then with frequent ruptures of the sheet material and with pocket walls that are not uniform. The present invention supports the entire surface of the sheet being stretched and it is particularly pointed out that the diaphragms 72 and 75 press into the minute recesses and valleys of the material being stretched subjecting all areas to the uniform pressure of the diaphragms. In this respect the over-hang feature of plate 80 is effective in preventing dragging or anchorage of the forming pockets against the non-extensible wall of cylinder case 62. The invention, in the preferred embodiment described and illustrated, subjects both sides of the material being formed into a pocket not only to equal fluid pressure but in end results to the effect of fluid contact during the stretching of the material, that is, the rubber of the bladders and the diaphragms under pressure substantially conforms to the surface of the sheet material as would a liquid under pressure. It will now be seen that the invention provides a vise-like grip on the area of material being formed into a pocket and said vise-like grip has the novel characteristic of expanding without releasing the pressure of the grip. Thus there can be no localized rupture or strain on the sheet or film independent of the diaphragms. It is believed, that it is these attributes of the features of the invention set out in this paragraph that makes possible the rapid forming of deep pockets in such materials as enumerated by substantially a hammer blow.

Hemispheroid pockets and deeper have been formed but the maximum depth of pocket possible is dependent on the type of material, temperature and various other factors.

Another important feature of the invention is the heating and cooling of the rubber diaphragms during their stretching and retraction respectively. As the diaphragms stretch into pocket form the stretching rubber becomes heated and assures a desirable temperature to be imparted to the sheet material clamped between the diaphragms. During retraction of the diaphragms after they have been forced into pocket form and during the rubber's return to it's original plane the rubber cools to a degree that feels cool to the touch of a person's hand. The hysteretic effect in the rubber during formation of the pocket is advantageous as is said cooling condition advantageous in promoting a set condition to the stretched polyethylene or other suitable material.

Figure 9 illustrates a modification of plate 80 wherein a plurality of openings in the plate are disposed for forming a plurality of pockets and of different shapes with one stroke of the pistons. The operation of the apparatus employing the plate with multiopening is the same as with a plate with the single opening 80.

The invention contemplates controlling, to a substantial extent, the degree of stretch at different areas of the diaphragms by molding the diaphragms with areas of greater thickness than other areas, or attaching nonextensible material to certain areas of the surface of the diaphragm or diaphragms. For example, if a smooth unstretched area to form a clear window is desired the diaphragm or diaphragms could be formed with a thick wall at that area to resist stretching, or a thin piece of metal of proper area may be vulcanized in, to or otherwise attached to the diaphragms. Obviously these areas could be made in various shapes and sizes.

A further modification of the invention is illustrated in Fig. 10 wherein a horizontal perforated plate or screen 6 is mounted on support 7 within bladder 76 and disposed at a predetermined distance from the bottom of bladder 76 and adapted to limit the depth pockets 10 will reach and if desired may be utilized to effect the shape or form of the pocket. While I prefer to use a screen or perforated plate to permit free flow of liquid therethrough it is obvious limit plate 6 could be bypassed in various ways and this plate could be of various surface contours if desired. It is also pointed out that when a limit plate is used for the purpose just stated that sealing gaskets for fluid 77 may be used as indicated heretofore and bladder 76 omitted in which case plate 6 would be mounted directly on piston 63.

Referring again to Figs. 5 and 6 and the description of the invention hereinabove, it will be understood that the pressure in fluid 74 of cylinder 61 stretches the walls of the bladders and the diaphragms and the force necessary to stretch diaphragm 75 causes this diaphragm to press against the sheet material sandwiched between the diaphragms with such necessary force. Obviously the thickness and modulus of rubber diaphragm will affect the force necessary to stretch it and applicant has found that the bladder 76, fluid 77, piston 63, piston rod 64 and this rod's associated elements may be omitted and apparatus otherwise operated as heretofore described will accomplish the objects of the present invention but not to as desirable extent as is the case where these enumerated elements are retained.

Figure 12 is an explanatory graphic design illustrating the utilization of strips or sheets 92 (Figs. 1 and 8), in which pockets have been formed, in combination with known packaging or wrapping apparatus, such, for example, as disclosed in my United States Patent No. 2,547,835, to which reference is made for teaching of suitable means to be employed, but with such modifications of the cooperating cavities at the wrapping stations as may be required to accommodate the particular article being wrapped as is the common practice with such cooperating rolls as shown in Fig. 12.

Referring now to Fig. 12 in detail the apparatus is referred to generically as 120 and comprises cooperating rolls 121, 122; temperature control rolls 125, 126; idler rolls 127, 128 and air pipes 129 and 130. Rolls 121 and 122 are provided with suitable cavities 123 and 124 to receive articles 131 being wrapped, such as cakes of soap, loaves of bread, apples, balls, granular material etc. delivered to said cavities by any satisfactory conveying and indexing means presently well known in the packaging art and not claimed per se in this application, therefore, a detailed description of same would serve no useful purpose in disclosing the present invention. The spacing of the cavities 123 and 124 about rolls 121 and 122 correspond to the spacing of pockets 10 (Figs. 7 and 8) in strips 92 and to start the wrapping operation these strips shown in Fig. 10 are manually led about rolls 127, 128; 125, 126; and 121, 122 so that pockets 10 of strips 92 are disposed over cavities 123 and 124. Roll 52 is a temperature control, for heating or cooling, and which in the present case preferably is an idler roll rotated by the movement of strips 92. With strips 92 fed onto said rolls as just described automatic wrapping of articles 131 begins by driving rolls 121 and 122 by any suitable means and surface speed in synchronism with the speed of delivery of objects 131 as will be understood by those familiar with the packaging art. Strips 92 are drawn onto rolls 121 and 122 from either stock rolls or directly from bite rolls 93, 94, (Fig. 2) through interposed compensator means not shown. Successive pockets in strips 92 continue to run onto rolls 121 and 122 in overlying relations to successive cavities 123 and 124 thereof since the spacing of the pockets and the cavities are the same as explained hereinbefore. It is pointed out however that the entrance of objects 131 into pockets 10 disposing the pockets in the cavities at the wrapping station serves as a further indexing means of said pockets relative to the cavities. Just prior to cavities 123 and 124 coming into cooperating relation pockets 10 overlying these cavities are subjected to a flow of air from pipes 129 and 130 of sufficient force to extend the pockets to substantially their originally formed shape. It will now be seen that the pockets in converging strips 92 will be brought into confronting relation over cooperating cavities of rolls 121 and 122 with an article 131 inclosed in said confronting pockets and with such apparatus as disclosed in my said patent the area of strips 92 adjacent said pockets will be sealed together and the successive sealed pockets severed one from the other.

From the foregoing it will be evident that I have provided novel method steps and apparatus for forming pockets in sheet material for covering various articles. If necessary to facilitate its proper shaping, the film or wrapping material may be softened either by heat or by moisture or otherwise, dependent upon the inherent properties of the particular material selected. Obviously the invention is susceptible of numerous modifications and the right is herein reserved to make such changes as fall within the scope of the appended claims without departing from the spirit of the invention.

I claim:

1. In the method of forming successive pockets in a strip of wrapping material comprising the steps of periodically advancing the strip to a position between two opposed rubber diaphragms at a pocket-forming station, bringing said diaphragms into contact with said strip, fixedly clamping said diaphragms and strip about an unsupported area of the same and in which a pocket is to be formed, clamping both diaphragms firmly against said strip by opposed fluid pressures with the fluid pressure greater on one diaphragm than the other so that the area of the elastic diaphragms and the strip within said rigidly clamped area is stretched into pocket form releasing said fluid pressure permitting the elastic diaphragms to retract to their original planes and to wrinkle said strip as it is returned to substantially its original plane by the retraction of said diaphragms.

2. A method of packaging which includes the steps of forming a plurality of pockets in a sheet of wrapping material, concurrently wrinkling and returning the walls of the pockets to the plane of the sheet, moving said sheet with the pockets formed therein to a wrapping station, re-establishing the pockets, and inserting material to be packaged into successive said pockets as they come to said station.

3. A method of packaging which includes the steps of forming a plurality of pockets in a sheet of wrapping material, concurrently wrinkling and returning the walls of the pockets to the plane of the sheet, moving said sheet with the pockets formed therein to a wrapping station, re-establishing the pockets, and inserting material to be packaged into successive said pockets as they come to said station, and sealing the walls of the pockets about the material within the pockets to complete covering the material.

4. In the method of continuously wrapping successive articles in thermoplastic sheet material, the combined steps of gripping areas of the sheet material between layers of elastic material, stretching the elastic material with the sheet material therebetween into pockets to form pockets in the latter, continuously feeding converging strips of the sheet material with pockets therein toward each other and a wrapping station, re-establishing the pockets, bringing pockets in the converging sheets into confronting relation at the wrapping station, inserting an article to be wrapped in said pockets as the pockets approach the wrapping station, and sealing said strips together adjacent said pockets to complete the inclosure of said article.

5. Apparatus for forming pockets in sheet wrapping material, comprising two axially aligned hydraulic cylinders with open confronting ends, a diaphragm of rubbery material disposed over each said confronting end in fluid tight contact with the cylinder on which the diaphragm is mounted, means for periodic advancing said sheet material a predetermined distance between said diaphragms, means for reciprocal axial travel of at least one of said cylinders to bring said diaphragms into periodic contact with said sheet material and to firmly clamp it between the diaphragms between the rigid ends of the cylinders, fluid pressure medium permanently inclosed in said cylinders, means for imparting a power stroke to a piston of one of the cylinders to force and stretch said diaphragms and sheet into fluid within the other cylinder, resilient means mounted on the piston rod of the latter mentioned cylinder to provide pressure in the fluid therein; and means, including a cam, for timing the successive operations of the apparatus through a cycle of operation thereof.

6. Apparatus for forming pockets in sheet wrapping material, including two axially aligned hydraulic cylinders having pistons and piston rods and with open confronting ends; a diaphragm of rubbery material disposed over each said confronting end in fluid tight relation with the cylinders; means for periodic advancing said sheet material a predetermined distance between said diaphragms; means for reciprocal axial movement of at least one of said cylinders to bring said diaphragms into periodic contact with said sheet material and to firmly clamp the sheet between the diaphragms at the ends of the walls of the cylinders; fluid pressure medium in each cylinder inclosed in an elastic bladder, each said bladder being in contact with the adjacent diaphragm and with the wall of the bladder adjacent the diaphragm being adhered to the wall of the cyclinder, a rigid apertured plate mounted on the end of one said cylinder under the adjacent diaphragm, the side of said aperture being spaced from the inside of the wall of the cylinder on which the plate is mounted; means for imparting a power stroke to the piston of the cylinder opposite said plate to force and stretch said diaphragms and the sheet sandwiched therebetween through said aperture into the adjoining cylinder; resilient means mounted on the piston rod of the latter cylinder to provide pressure in the fluid of the latter cylinder against the diaphragm that lies next to said plate; and means for timing said periodic advance, clamping, stretching through a cycle of operation of the apparatus.

7. In the method of packaging comprising the steps of forming a plurality of pockets at predetermined intervals in separate sheets of wrapping material, concurrently wrinkling and returning the walls of the pockets to the plane of the sheet in which the pockets are formed; moving said sheets, with the walls of said pockets in the planes of the sheets, in a converging direction relative to each other to a covering station; re-establishing the previously formed pockets, bringing said sheets into contact at said station and the openings of successive pockets of the converging sheets into confronting relation, inserting material to be packaged into said pockets and then passing the confronting pockets through the wrapping station and sealing said sheets together adjacent the pockets as they pass through the wrapping station.

8. In the method of packaging comprising the steps of forming a plurality of pockets at predetermined intervals in separate sheets of wrapping material of the character described, concurrently wrinkling and returning the walls of the pockets to the plane of the sheet in which the pockets are formed; moving said sheets with the walls of said pockets in the planes of the sheets, in a converging direction relative to each other to a covering station; re-establishing the previously formed pockets, bringing said sheets into contact at said station and the openings of successive pockets of the converging sheets into confronting relation, inserting material to be packaged into said pockets and then passing the confronting pockets through the wrapping station and sealing said sheets together adjacent the pockets as they pass through the wrapping station.

9. In the method of packaging comprising the steps of forming a plurality of pockets at predetermined intervals in separate thin sheets of polyethylene wrapping material, concurrently wrinkling and returning the walls of the pockets to the plane of the sheet in which the pockets are formed, moving said sheets, with the walls of said pockets in the planes of the sheets, in a converging direction relative to each other to a covering station; re-establishing the previously formed pockets, bringing said sheets into contact at said station and the openings of successive pockets of the converging sheets into confronting relation, inserting material to be packaged into said pockets and then passing the confronting pockets through the wrapping station and sealing said sheets together, adjacent the pockets as they pass through the wrapping station.

10. In the method of packaging which includes the steps of forming successive pockets in a strip of wrapping material, at predetermined intervals, by first sandwiching the portion of said strip in which a pocket is to be formed between layers of elastic material; applying opposed different fluid pressures to said layers whereby the wrapping material is gripped between the layers and the layers and the portion of the wrapping so gripped are simultaneously stretched into pocket form; returning the layers of elastic material to the form they were before said pocket was formed and thereby wrinkling the wall of the pocket of wrapping material as the latter is returned to its original plane between the elastic layers; advancing two strips of said material, in which successive pockets have been formed in a converging direction, relative to each other to a packaging station; re-establishing the previously formed pockets, bringing the converging strips in contact at said station with the openings of successive pockets of said strips in confronting relation; inserting material to be packaged into said pockets and then passing the confronting pockets through the packaging station and sealing said strips together adjacent the pockets.

11. In the method of packaging which includes the steps of forming successive pockets in a strip of wrapping material, at predetermined intervals, by first sandwiching the portion of said strip in which a pocket is to be formed between layers of elastic material; applying opposed different fluid pressures to said layers whereby the wrapping material is gripped between the layers and the layers and the portion of the wrapping so gripped are simultaneously stretched into pocket form; returning the layers of elastic material to the form they were before said pocket was formed and thereby wrinkling the wall of the pocket of wrapping material as the latter is returned to its original plane between the elastic layers; advancing two strips of said material, in which successive pockets have been formed, in a converging direction, relative to each other to a packaging station; re-establishing the previously formed pockets, bringing the converging strips in contact at said station with the openings of successive pockets of said strips in confronting relation, inserting material to be packaged into said pockets and then passing the confronting pockets through the packaging station and sealing said strips together adjacent the pockets as the pockets pass htrough the wrapping station.

12. In the method of forming a pocket in packaging material of the character described, comprising sandwiching a thin sheet of the material between layers of elastic material; clamping the layers and the packaging material between and over open ends of hydraulic cylinders, applying differential fluid pressure to the elastic layers whereby the packaging material is firmly gripped therebetween and said layers and material are stretched into a pocket form; removing the hydraulic pressure thereby permitting the elastic layers to return to their original planes causing the said thin sheet to wrinkle as it is returned to substantially it original plane between said layers.

13. Apparatus for forming pockets in sheet wrapping material, comprising two axially aligned hydraulic cylinders with open confronting ends, a diaphragm of rubbery material disposed over each said confronting end in fluid tight contact with the cylinder on which the diaphragm is mounted, means for periodic advancing said sheet material a predetermined distance between said diaphragms, means for reciprocal axial travel of at least one of said cylinders to bring said diaphragms into periodic contact with said sheet material and to firmly clamp it between the diaphragms between the rigid ends of the cylinders, fluid pressure medium permanently inclosed in said cylinders, means for imparting a power stroke to a piston of one of the cylinders to force and stretch said diaphragms and sheet into fluid within the other cylinder, resilient means to provide pressure in the fluid of the latter mentioned cylinder; and means for timing the successive operations of the apparatus through a cycle of operation thereof.

References Cited in the file of this patent

UNITED STATES PATENTS

| | | |
|---|---|---|
| 2,403,482 | Cloud | July 9, 1946 |
| 2,490,781 | Cloud | Dec. 13, 1949 |
| 2,549,123 | Osterhof | Apr. 17, 1951 |
| 2,736,150 | Loew | Feb. 28, 1956 |
| 2,886,931 | Karpowicz | May 19, 1959 |

FOREIGN PATENTS

| | | |
|---|---|---|
| 111,060 | Great Britain | Nov. 15, 1917 |